(No Model.)

F. M. GILBERT.
PLATFORM GATE FOR RAILWAY CARS.

No. 402,919. Patented May 7, 1889.

Witnesses:
James E. Arnold
H. H. Shove

Inventor:
Frank M. Gilbert
By Benj. Arnold Atty

UNITED STATES PATENT OFFICE.

FRANK M. GILBERT, OF NEW YORK, N. Y.

PLATFORM-GATE FOR RAILWAY-CARS.

SPECIFICATION forming part of Letters Patent No. 402,919, dated May 7, 1889.

Application filed December 29, 1888. Serial No. 294,978. (No model.)

*To all whom it may concern:*

Be it known that I, FRANK M. GILBERT, of New York, in the county of New York and State of New York, have invented certain new and useful Improvements in Railway-Car Platform-Gates; and I do hereby declare that the following is a full, clear, and exact description thereof, reference being had to the accompanying drawings, and to the letters of reference marked thereon, which form a part of this specification.

The gate which is the subject of this invention is intended more especially for use on elevated-railway cars, though it is also capable of being applied with great advantage in other positions.

It is designed to obviate some objections that apply to the swinging gate at present in use, one of which is the great difficulty in opening or closing them in great crowds, for a gate can be raised or lowered between persons when a swinging gate would be effectually blocked up. Gates have been devised for this purpose working on the "lazy-tongs" principle to rise up from below; but the temptation for persons in haste or crowded to try to step over the gate when partly raised is liable to produce dangerous and unpleasant positions for those who use the cars.

The invention is illustrated in the accompanying drawings.

Figure 1:
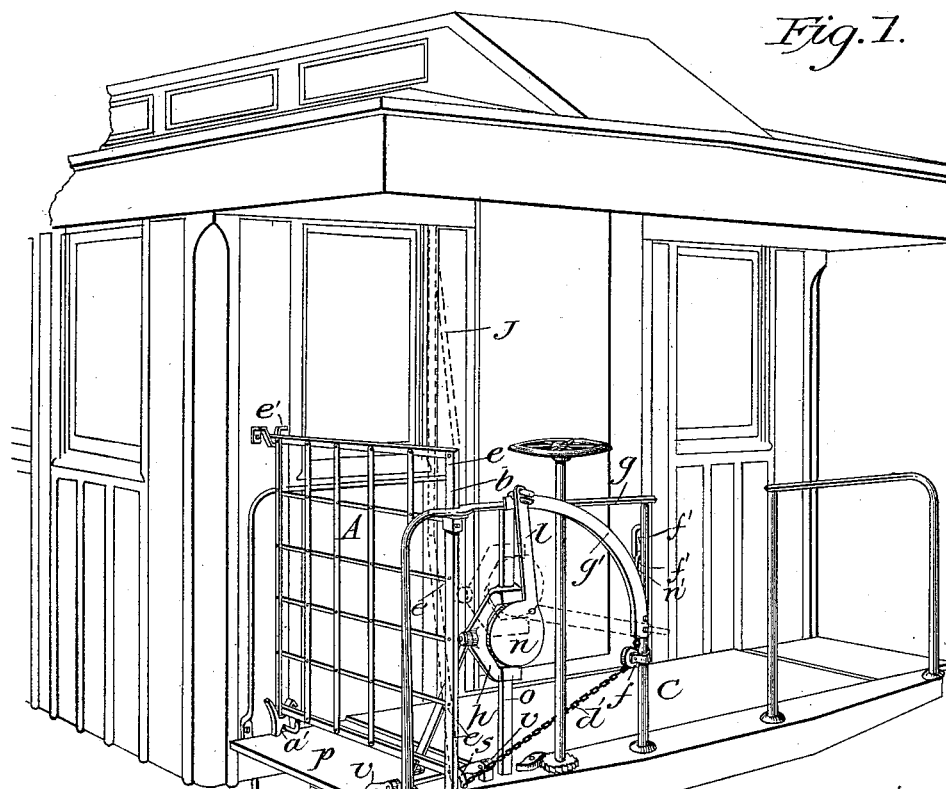
Figure 2:
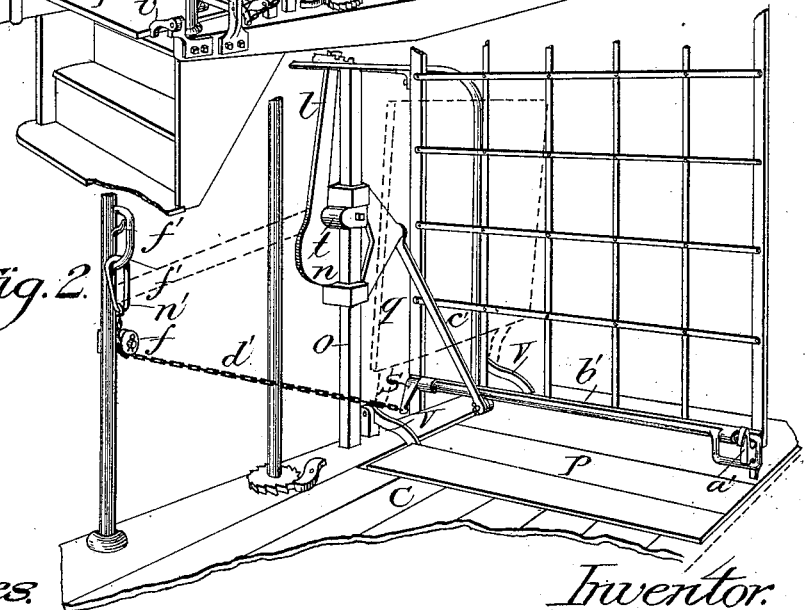

Figure 1 shows a perspective view from the outside of part of a railway-car with the gate attached with the devices for operating it. Fig. 2 shows a perspective view from the inside of a part of a car-platform with the gate, and also a hinged bridge to cover the car-steps, and its connection with the gate whereby it can be raised.

The gate A is composed of a top bar, to which a number of vertical bars are pivoted at their upper ends, and a series of horizontal bars secured to each of the vertical bars where they cross them in the same manner as the upper ends—that is, with pivots or rivets sufficiently loose to allow the bars to move on them—so that the gate may be raised on its hinges $e\ e$, which are made by pivoting the ends of the horizontal bars to the supporting-bar $b$, and when the gate is raised to the position shown by the dotted lines $j$, Fig. 1, all its bars will be closed up together and occupy but little space.

The usual guard-rail, $g$, has one of its supporting-bars $o$ made preferably square, and a clasp, $h$, having two arms, is fitted to slide freely on it, being prevented from turning by the square form of the bar $o$. A clamp, $t$, is rigidly secured to the bar $o$, and a cam, $n$, is held on a stud made fast in the clamp $t$. The cam $n$ is made of the proper size to just turn freely between the upper and lower arms of the clasp $h$, in which position it operates. An arm, $l$, is made fast on one side of the cam $n$, and the outer end of the arm is furnished with a handle, by which it may be moved to turn the cam. A curved bar, $g'$, is attached to the guard-railing to guide and steady the arm $l$, and notches are made in it near each end to receive a locking-latch attached to the arm, by which it can be made fast at either extremity of its motion. The sliding clasp $h$ is connected by a rod, $c'$, to the bottom bar of the gate A.

In Fig. 2 the bridge $p$ is shown, and the devices by which it is connected to and raised by the gate A when the steps are required for use, as will be hereinafter explained. This bridge $p$ is hinged at $v\ v$ to the platform $c$, so that it can be turned up toward the guard-rail $g$, as shown by the dotted lines $q$, Fig. 2. A rod, $b'$, is attached to the bottom bar of the gate A in bearings near each end, in which it is free to turn. A portion of the rod $b'$ is made flat at its outer end, and a slot is made in this part to receive the hook $a'$, which is attached securely to the bridge $p$ in such a position that the hook shall enter the slot when the flat portion of the rod $b'$ is allowed to turn down by its weight. An arm, $s'$, fast on the inner end of the rod $b'$, has a cord or chain, $d'$, attached to it, which passes around the pulleys $f\ f$ to a ring, $n'$, which is held on one of the hooks $f'\ f'$ in the guard-railing. By means of this ring and its connections the gate A and bridge $p$ can be connected or disconnected with each other by the person who operates the gate without leaving his position in which he raises the gate.

The reason for providing a chance to connect or disconnect the gate and bridge is because on some railways some of the stationplatforms are on a level with the car-platform, and the bridge $p$ is required to be left down when the gate is raised to form a footing over the car-steps from the car to the station platform, while at other stations the platform or landings are below the car-platform, and it is necessary to raise the bridge $p$ that the car-steps may be used.

A projection, $e'$, is attached to the body of the car, having a V-shaped notch made in it to receive the outer end of the upper rail of the gate A, and a similar notch is made on the top of the hook $a'$ for the end of the bottom rail to rest in. These locking-pieces are for the purpose of holding the gate firmly against any pressure when closed. One great advantage of this arrangement is that a person standing in the opening in the guard-rail in the middle of the car-platform can open or close the gates of two adjoining cars, and raise or leave down the bridges and also control the signal-cord without leaving his first position.

To open the gate, the operator, standing in the opening in the guard-railing, pulls the handle of the lever $l$ over toward him and downward. This turns the cam $n$, which raises the sliding clasp $h$ by pressing against its upper arm. The clasp, by means of the rod $c'$, raises the gate A up into the position shown by the dotted lines $j$ in Fig. 1.

The gate is lowered by reversing the motion of lever $l$. When it is necessary to raise the bridge $p$, that the car-steps may be used at a low landing, the operator, standing in the position as above described for opening the gates, before pulling on the lever $l$ moves the ring $n'$ from the upper hook, $f'$, to the lower hook, which slackens the chain $d'$ and allows the rod $b'$, which was held from turning by it, to turn down and catch the hook $a'$ in its slot, and then, when the gate A is raised by the operator with the lever $l$, the bridge $p$ will rise with it to the position shown by the dotted lines in Fig. 2.

The normal position of the bridge $p$ is supposed to be down, in which case the ring $n'$ is on the upper hook, $f'$, holding the rod $b'$ up clear of the hook $a'$.

Having thus described my improvements, what I claim as my invention is—

1. The combination, with a railway-car, of a gate made of vertical and horizontal bars and hinged to a supporting-bar at the end of the car-platform, substantially as described, and arranged to be raised close up to the supporting-bar, and mechanism whereby it can be operated by a person standing at the opening in the guard-railing at the end of the car-platform, substantially as and for the purpose set forth.

2. The combination, with a railway-car and a platform-gate made with vertical and horizontal bars and hinged to a supporting-bar at the end of the car-platform, substantially as described, said gate being jointed and arranged to be raised up close to the supporting-bar, of the sliding clasp $h$, cam $m$, clasp $t$, lever-arm $l$, and connecting-rod $c'$, substantially as described, and for the purpose set forth.

3. The combination, with a car-platform gate arranged to be raised up to one side, substantially as described, of a bridge to cover the car-steps, connected to the said gate, so that it will be raised with it in the same direction, substantially as and for the purpose set forth.

4. The combination, with a car-platform gate jointed and arranged to rise up to one side, substantially as described, of a bridge hinged to the car-platform to cover the car-steps, and devices whereby the bridge may be connected to the said gate, so as to be raised with it when necessary, substantially as and for the purpose specified.

5. The combination, with a car-platform gate, of the bridge $p$, rod $b'$, hook $a'$, arm $s'$, pulleys $ff$, and chain $d'$, substantially as specified, and for the purpose set forth.

FRANK M. GILBERT.

Witnesses:
H. A. SHOVE.
BENJ. ARNOLD.